US012711571B2

(12) United States Patent
Xu et al.

(10) Patent No.: US 12,711,571 B2
(45) Date of Patent: Aug. 18, 2026

(54) IMAGE PROCESSING METHOD, ELECTRONIC DEVICE AND STORAGE MEDIUM

(71) Applicants: Douyin Vision Co., Ltd., Beijing (CN); Lemon Inc., Grand Cayman (KY)

(72) Inventors: Ziyao Xu, Beijing (CN); Yi Liu, Beijing (CN); Shijie Zhao, Beijing (CN); Junlin Li, Los Angeles, CA (US); Li Zhang, Los Angeles, CA (US)

(73) Assignees: Douyin Vision Co., Ltd., Beijing (CN); Lemon Inc., Grand Cayman (KY)

( * ) Notice: Subject to any disclaimer, the term of this patent is extended or adjusted under 35 U.S.C. 154(b) by 145 days.

(21) Appl. No.: 18/813,778

(22) Filed: Aug. 23, 2024

(65) Prior Publication Data

US 2025/0069185 A1 Feb. 27, 2025

(30) Foreign Application Priority Data

Aug. 23, 2023 (CN) ........................ 202311067464.X

(51) Int. Cl.
*G06T 3/40* (2024.01)

(52) U.S. Cl.
CPC ..................................... *G06T 3/40* (2013.01)

(58) Field of Classification Search
None
See application file for complete search history.

(56) References Cited

FOREIGN PATENT DOCUMENTS

| | | | | |
|---|---|---|---|---|
| CN | 109782414 A | | 5/2019 | |
| CN | 110060210 B | * | 5/2021 | ............... G06T 5/50 |
| CN | 115409975 A | * | 11/2022 | ............. G06V 10/36 |

OTHER PUBLICATIONS

Stergiou et al. AdaPool: Exponential Adaptive Pooling for Information-Retaining Downsampling, IEEE Transactions on Image Processing, vol. 32, 2023 (Year: 2023).*

Ssim, Baidu Baike, Retrieved from URL: https://baike.baidu.com/item/SSIM/2091025 on Aug. 2, 2024, pp. 1-3. (Abstract attached).

* cited by examiner

*Primary Examiner* — Yingchun He

(57) ABSTRACT

An image processing method, an electronic device and a storage medium are provided. The method includes acquiring a first image; performing down-sampling processing on the first image to obtain a first down-sampled image; performing average pooling processing on pixels in the first down-sampled image to obtain a first pooled image; determining a plurality of pixel merging weights corresponding to pixels in the first down-sampled image; and performing pixel merging processing on the first down-sampled image and the first pooled image based on the plurality of pixel merging weights to obtain a second image.

20 Claims, 10 Drawing Sheets

IMAGE PROCESSING METHOD, ELECTRONIC DEVICE AND STORAGE MEDIUM

CROSS-REFERENCE TO RELATED APPLICATION(S)

This application claims the priority of Chinese Patent Application No. 202311067464.X filed on Aug. 23, 2023, and the disclosure of the above-mentioned Chinese Patent Application is hereby incorporated in its entirety by reference as a part of this application.

TECHNICAL FIELD

Embodiments of the disclosure relate to the technical field of image processing, for example, to an image processing method and apparatus, an electronic device and a storage medium.

BACKGROUND

Down-sampling of the image can adjust the resolution of the video or image, so that the video or image can reach the appropriate size.

At present, electronic device can obtain the corresponding down-sampled image based on nearest neighbor interpolation. For example, the electronic device can select the pixel closest to the sampling point as the new pixel in the down-sampled image, to obtain the down-sampled image. However, when the image is down-sampled according to the above method, more image information will be lost, resulting in lower definition of the down-sampled image.

SUMMARY

Embodiments of the present disclosure provide an image processing method and apparatus, an electronic device and a storage medium, which can solve one or more technical problems in the prior art.

An embodiment of the present disclosure provides an image processing method, including:

- acquiring a first image;
- performing down-sampling processing on the first image to obtain a first down-sampled image;
- performing average pooling processing on pixels in the first down-sampled image to obtain a first pooled image;
- determining a plurality of pixel merging weights corresponding to the pixels in the first down-sampled image; and
- performing pixel merging processing on the first down-sampled image and the first pooled image based on the plurality of pixel merging weights to obtain a second image.

An embodiment of present disclosure further provides an image processing apparatus, including an acquisition module, a sampling module, a pooling module, a determining module and a processing module, wherein:

- the acquisition module is configured to acquire a first image;
- the sampling module is configured to perform down-sampling processing on the first image to obtain a first down-sampled image;
- the pooling module is configured to perform average pooling processing on pixels in the first down-sampled image to obtain a first pooled image;

- the determining module is configured to determine a plurality of pixel merging weights corresponding to the pixels in the first down-sampled image; and
- the processing module is configured to perform pixel merging processing on the first down-sampled image and the first pooled image based on the plurality of pixel merging weights to obtain a second image.

An embodiment of present disclosure further provides an electronic device, including at least one processor and a memory on which computer-readable instructions are stored; wherein the at least one processor is configured to execute the computer-executable instructions stored in the memory, so that the at least one processor executes the image processing method as described in the above embodiment and various possible aspects of the above embodiment.

An embodiment of the present disclosure further provides a non-transient computer-readable storage medium, in which computer-executable instructions are stored, wherein the computer-executable instructions, when executed by a processer, are configured to cause the processer to execute the image processing method as described in the above embodiment and various possible aspects of the above embodiment.

BRIEF DESCRIPTION OF DRAWINGS

In order to explain the embodiments of the present disclosure or the technical solutions in the prior art more clearly, the drawings necessary for the description of the embodiments or the prior art will be briefly introduced below. Obviously, the drawings in the following description are merely some but not all of the embodiments of the present disclosure, and other drawings can be obtained by those ordinary skilled in the art according to these drawings without creative labor.

DETAILED DESCRIPTION

Reference will now be made in detail to exemplary embodiments, examples of which are illustrated in the accompanying drawings. When the following description involves the drawings, the same numbers in different drawings indicate the same or similar elements, unless otherwise indicated. The implementations described in the following exemplary embodiments do not represent all implementations consistent with the present disclosure. Rather, they are merely examples of devices and methods consistent with some aspects of the present disclosure as detailed in the appended claims.

In order to facilitate understanding, the concepts related to the embodiments of the present disclosure are described below.

Electronic device refers to a kind of equipment with wireless transceiver function. The electronic device can be deployed on land, including indoor or outdoor, handheld, wearable or vehicle-mounted electronic devices. The electronic device can be a mobile phone, a portable android device (PAD), a computer with wireless transceiver function, a virtual reality (VR) electronic device, an augmented reality (AR) electronic device, a wireless terminal in industrial control, a vehicle-mounted electronic device, a wireless terminal in self-driving, a wireless electronic device in remote medical application, a wireless electronic device in smart grid, a wireless electronic device in transportation safety, a wireless electronic device in smart city, a wireless electronic device in smart home, and a wearable electronic device, etc. The electronic device related to the embodiment of the present disclosure can also be referred to as terminal, user equipment (UE), access electronic device, vehicle-mounted terminal, industrial control terminal, UE unit, UE station, mobile station, mobile stage, remote station, remote electronic device, mobile equipment, UE electronic device, wireless communication equipment, UE agent or UE device, etc. Electronic device can also be fixed or mobile.

Figure 1:
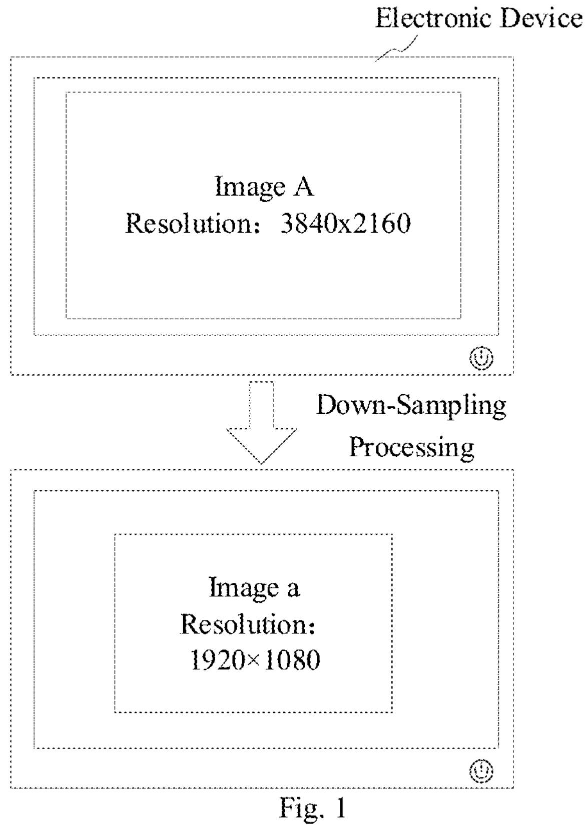
FIG. 1 is a schematic diagram of an application scenario provided by an embodiment of the present disclosure.

Reference now is made to FIG. 1, an application scenario of an embodiment of the present disclosure will be described.

FIG. 1 is a schematic diagram of an application scenario provided by an embodiment of the present disclosure. Referring to FIG. 1, it shows an electronic device. A display interface of the electronic device includes an image A, and the resolution of the image A is 3840*2160. The electronic device can perform down-sampling processing on the image A to obtain an image a, and the resolution of the image a is 1902*1080. In the embodiment shown in FIG. 1, the objects in image A and image a are the same (for example, if the image A includes apples, the image a also includes apples), but the number of pixels in the image a is smaller than that of the image A. in this way, the image can be made to conform to the size of the display area by means of the down-sampling processing.

It should be noted that FIG. 1 is only an exemplary illustration of the application scenario of the embodiment of the present disclosure, and is not a limitation of the application scenario of the embodiments of the present disclosure.

In the related art, the electronic device can obtain the corresponding down-sampled image based on the nearest neighbor interpolation method. For example, given that the resolution of an original image is 800*800, and if the down-sampling ratio is 2, the electronic device can set 400*400 sampling points in the original image, and take the pixel closest to each sampling point as the new pixel in the down-sampled image. In this way, the down-sampled image corresponding to the original image can be obtained (the resolution is 400*400). However, in the above method, the electronic device remains the pixels closest to the sampling points, so that 400*400 pixels in the original image will be lost in the down-sampled image obtained by the electronic device, resulting in more image information loss in the down-sampled image and poor definition of the down-sampled image.

In order to solve the technical problems in the related art, the embodiment of the disclosure provides an image processing method. An electronic device can acquire a first image, perform down-sampling processing on the first image to obtain a down-sampled image, determine N image blocks from the down-sampled image, determine an average pixel value corresponding to a plurality of pixels in each image block, and generate a first pooled image based on the average pixel value corresponding to each image block. The first pooled image includes N pixels, the pixel values of the N pixels are in one-to-one correspondence with the average pixel values of the N image blocks. The electronic device can determine a plurality of pixel merging weights corresponding to the pixels in the down-sampled image, and perform pixel merging processing on the down-sampled image and the first pooled image based on the plurality of pixel merging weights to obtain a second image. In this way, since each pixel in the first pooled image is determined by a plurality of pixels in the down-sampled image, more image information of the first image can be retained in the second image obtained by the electronic device based on the first pooled image and the down-sampled image, which can not only reduce the resolution of the second image, but also improve the definition of the second image.

The technical solution of the present disclosure and how the technical solution of the present disclosure can solve the above technical problems will be described in detail with exemplary embodiments. The following exemplary embodiments can be combined with each other, and the same or similar concepts or processes may not be repeated in some embodiments. Embodiments of the present disclosure will be described below with reference to the accompanying drawings.

Figure 2:
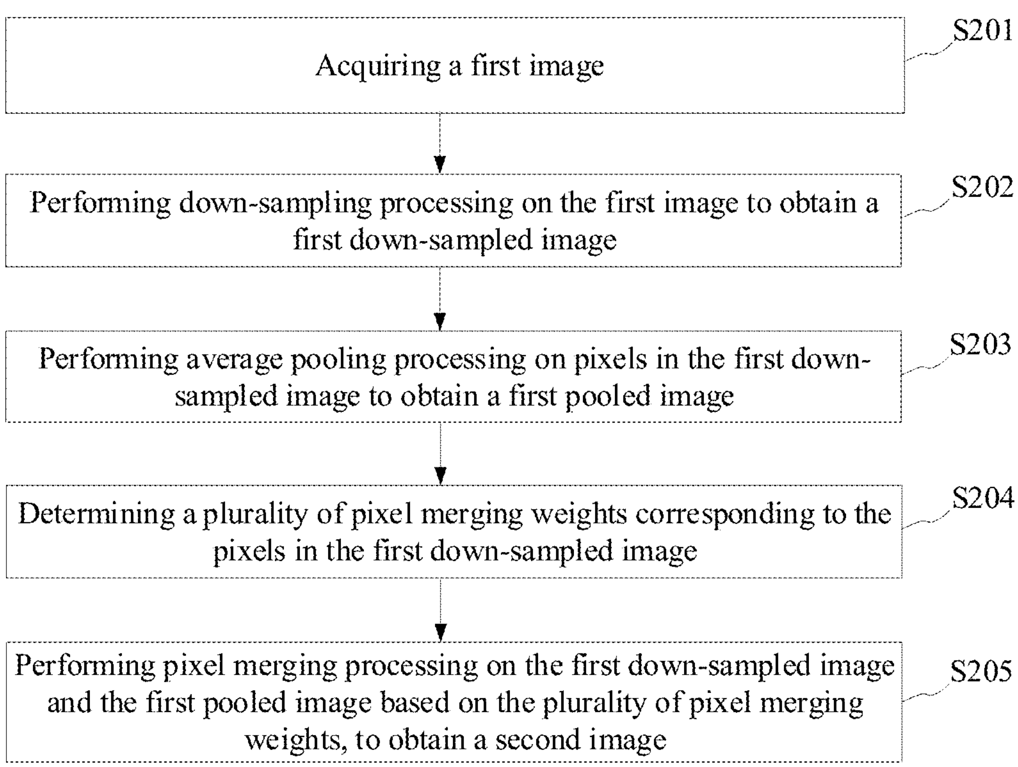
FIG. 2 is a flowchart of an image processing method provided by an embodiment of the present disclosure.

FIG. 2 is a flowchart of an image processing method provided by an embodiment of the present disclosure. Referring to FIG. 2, the method may include:

S201, acquiring a first image.

The execution subject of the embodiment of the present disclosure may be an electronic device or an image processing apparatus provided in the electronic device. The image processing apparatus can be realized based on software, and the image processing apparatus can also be realized based on the combination of software and hardware. Alternatively, the electronic device can be a device with on-end computing capability.

The first image may be an image to be down-sampled. For example, the first image may be an image with higher resolution. For example, in an application scenario, when an image acquired by an electronic device does not match the screen of the electronic device, the electronic device can perform down-sampling processing on the image so that the down-sampled image matches the screen of the electronic device; this image can be the first image. For example, if the resolution of an image acquired by an electronic device is 800*800 and the screen resolution of the electronic device is 400*400, the electronic device can determine the image as the first image and perform down-sampling processing on the image by a down-sampling ratio of 2.

It should be noted that the electronic device can receive the first image sent by other devices, and can also acquire the first image based on any feasible implementation, which is not limited in the embodiment of the present disclosure.

S202: performing down-sampling processing on the first image to obtain a first down-sampled image.

The first down-sampled image may be an image obtained by reducing the resolution of the first image. The electronic device can obtain the first down-sampled image based on the following feasible implementation: acquiring a down-sampling ratio, and performing average down-sampling processing on the first image based on the down-sampling ratio to obtain the first down-sampled image. For example, if the down-sampling ratio is 2, the electronic device can perform average down-sampling processing on the first image by a ratio of 2. The average down-sampling can be linear sampling, etc., which is not limited in the embodiment of the present disclosure. When the electronic device performs average down-sampling processing on the first image, it can determine the average value of pixel values around the sampling point as a pixel value of the first down-sampled image, so that each pixel in the first down-sampled image can merge the surrounding pixel information to enable the first down-sampled image to retain more image information of the first image, thereby improving the definition of the image after down-sampling.

S203: performing average pooling processing on pixels in the first down-sampled image to obtain a first pooled image.

Each pixel in the first pooled image is obtained by merging a plurality of pixels in the first down-sampled image. For example, for any pixel in the first pooled image, the value of the pixel (the value of RGB) may be the average value of the values of a plurality of pixels in the first down-sampled image.

For example, the electronic device can obtain the first pooled image based on the following feasible implementation: determining N image blocks from the first down-sampled image, determining an average pixel value corresponding to a plurality of pixels in each image block, and generating the first pooled image based on the average pixel value corresponding to each image block. N is an integer greater than 1.

In this way, each pixel in the first pooled image can merge a plurality of pixels in the first down-sampled image, and since the pixels in the first down-sampled image can retain more pixel information of the first image, the first pooled image can also retain more pixel information of the first image.

The first pooled image includes N pixels, and the pixel values of the N pixels are in one-to-one correspondence with the average values of the N image blocks. For example, if the electronic device determines 10 image blocks from the first down-sampled image, the first pooled image may include 10 pixels; and if the electronic device determines 100 image blocks from the first down-sampled image, the first pooled image may include 100 pixels. For example, if an image block includes pixel 1, pixel 2 and pixel 3, the pixel value of the pixel in the first pooled image corresponding to the image block is an average value of pixels values of pixel 1, pixel 2 and pixel 3.

In an embodiment of the present disclosure, a plurality of pixels may be included in the image block. For example, an image block may include 1 pixel, 4 pixels, 9 pixels, etc., which is not limited in the embodiment of the present disclosure. It should be noted that the shape of the image block in the embodiment of the present disclosure can be rectangular shape, square shape or arbitrary shape, which is not limited in the embodiment of the present disclosure.

In an embodiment of the present disclosure, the electronic device determines N image blocks from the first down-sampled image, which may include: determining a sliding window, controlling the sliding window to slide for N times in the first down-sampled image based on a preset sliding step size to obtain N groups of pixels, and determining each group of pixels as one image block to obtain the N image blocks. For example, if the preset sliding step size is M pixel units, the sliding window can slide rightwards by M pixel units at a time; and after each row of sliding, the sliding window can slide downwards by M pixel units, until the N image blocks are obtained.

It should be noted that the sliding window in the embodiment of the present disclosure can also slide based on any feasible implementation (for example, the sliding window slides downwards by one pixel unit, the sliding window slides rightwards by one pixel unit, etc.), which is not limited in the embodiment of the present disclosure.

In an embodiment of the present disclosure, the size of the sliding window may be as same as that of the image block. For example, if the size of an image block is 2 pixels in the length and 2 pixels in the width, the size of the sliding window corresponding to the image block can be 2 pixels in the length and 2 pixels in the width; if the size of the image block is 4 pixels in the length and 4 pixels in the width, the size of the sliding window corresponding to the image block can be 4 pixels in the length and 4 pixels in the width.

Hereinafter, the process of determining an image block in a first down-sampled image will be described with reference to FIG. 3.

Figure 3:
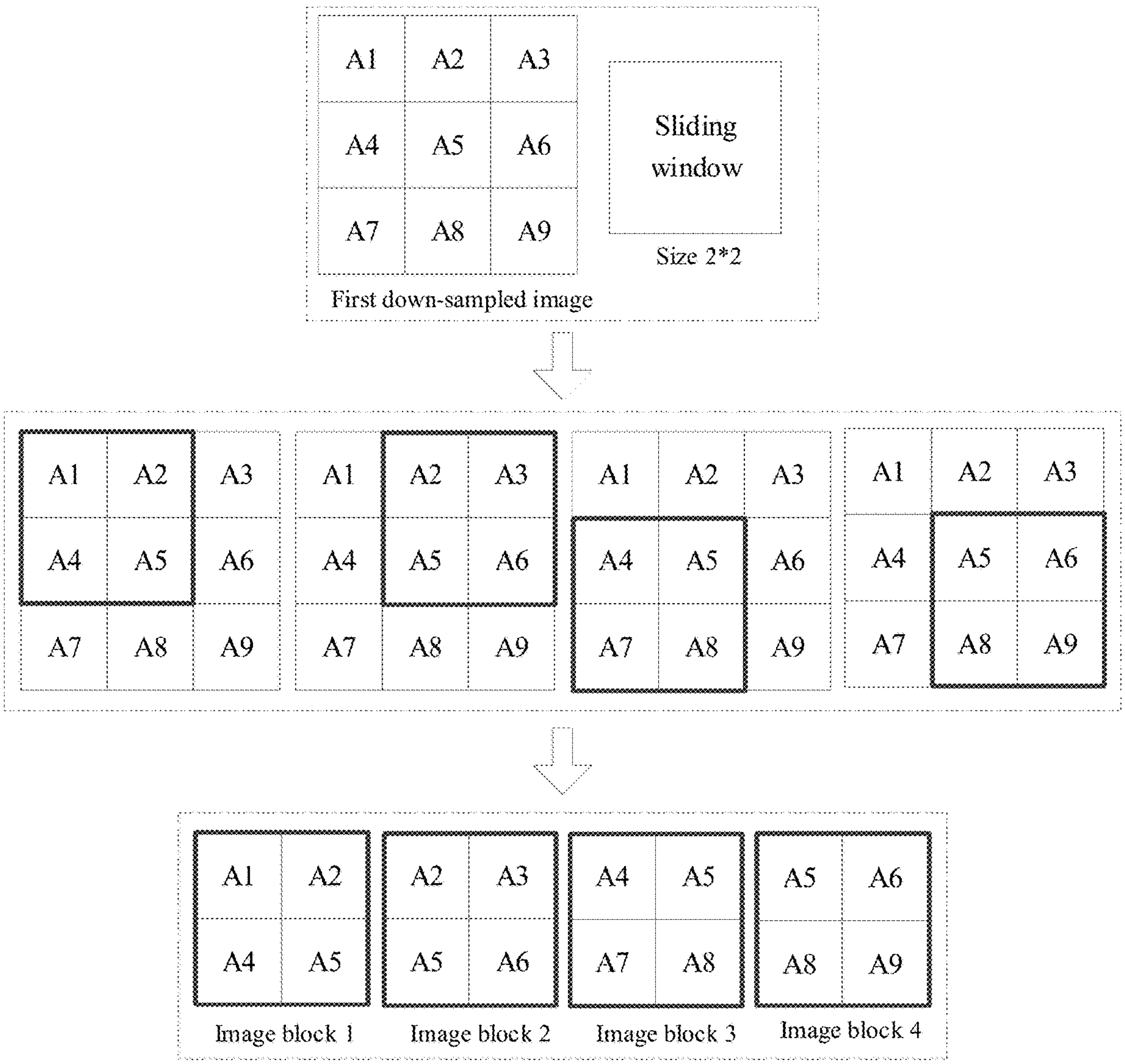
FIG. 3 is a schematic diagram of a process for determining an image block provided by an embodiment of the present disclosure.

FIG. 3 is a schematic diagram of a process of determining an image block provided by an embodiment of the present disclosure. Referring to FIG. 3, which shows the first down-sampled image and the sliding window. The first down-sampled image can include pixel A1, pixel A2, pixel A3, pixel A4, pixel A5, pixel A6, pixel A7, pixel A8 and pixel A9, and the size of the sliding window can be 2*2 (with 2 pixels in both length and width). Based on the sliding window, a sliding process can be carried out on the first down-sampled image for four times, in which the sliding window can move horizontally, from the upper left corner of the first down-sampled image, by one pixel at each time, and after the horizontal sliding is finished, the sliding window can move vertically by one pixel and move horizontally by one pixel at each time.

Referring to FIG. 3, after the sliding window slides for four times in the first down-sampled image, image block 1, image block 2, image block 3 and image block 4 can be obtained. Among them, image block 1 can include pixels A1, A2, A4 and A5, image block 2 can include pixels A2, A3, A5 and A6, image block 3 can include pixels A4, A5, A7 and A8, and image block 4 can include pixels A5, A6, A8 and A9. In this way, the electronic device can determine a plurality of image blocks from the first down-sampled image based on the sliding window, thus improving the efficiency and accuracy of determining the image blocks.

Alternatively, the electronic device can determine the size of the sliding window based on the corresponding down-sampling ratio of the first image. For example, if the down-sampling ratio corresponding to the first image is 2, the size of the sliding window can be 2*2 (with 2 pixels in both length and width); if the down-sampling ratio corresponding to the first image is 3, the size of the sliding window can be 3*3 (with 3 pixels in both length and width).

It should be noted that the electronic device can also determine the size of the sliding window based on any other feasible implementation, which is not limited in the embodiment of the present disclosure.

Hereinafter, the process of determining the first pooled image corresponding to the first down-sampled image will be described with reference to FIG. 4.

Figure 4:
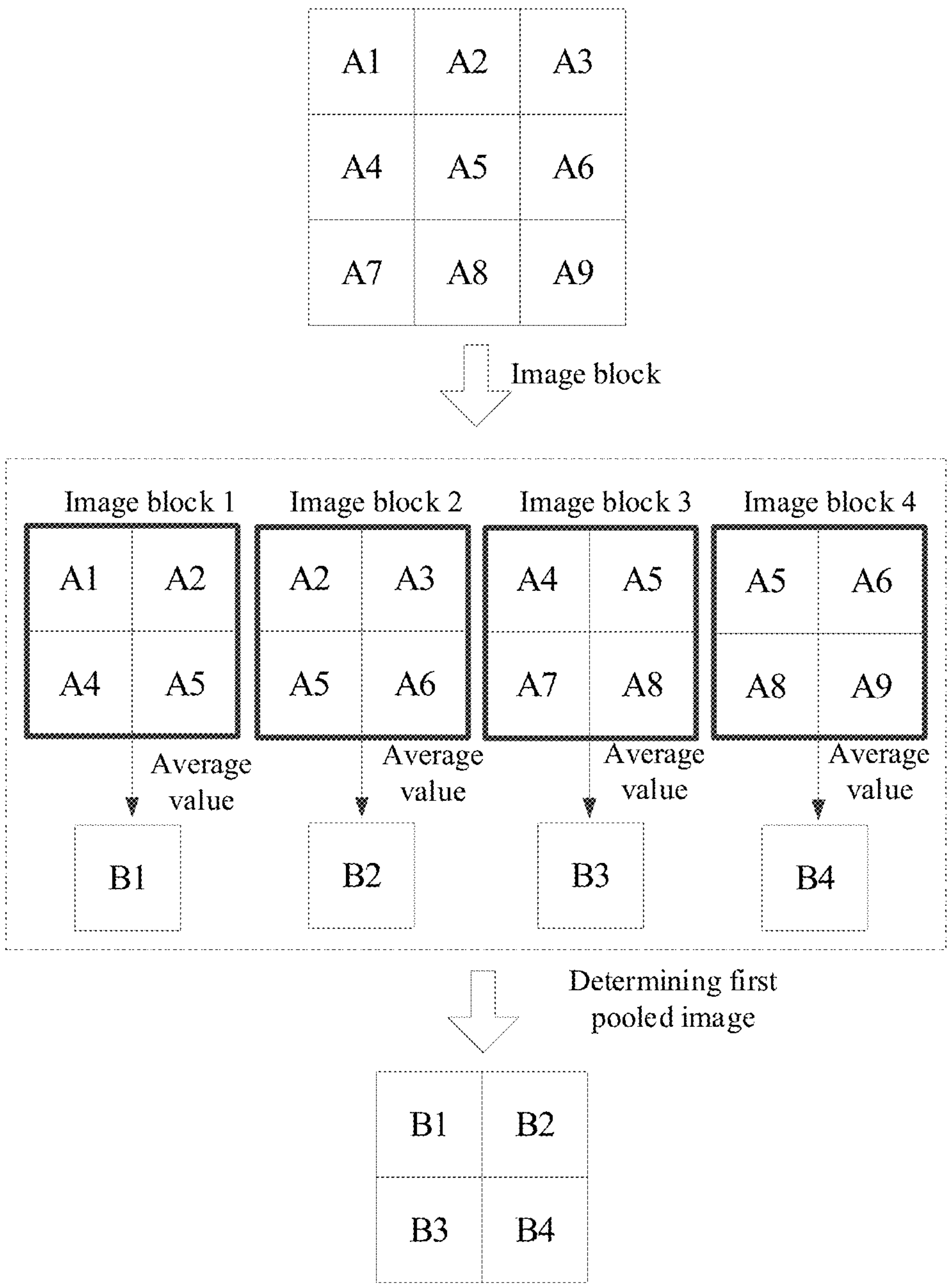
FIG. 4 is a schematic diagram of a process for determining a first pooled image provided by an embodiment of the present disclosure.

FIG. 4 is a schematic diagram of a process for determining a first pooled image provided by an embodiment of the present disclosure. Referring to FIG. 4, which shows a first down-sampled image. The first down-sampled image can include pixel A1, pixel A2, pixel A3, pixel A4, pixel A5, pixel A6, pixel A7, pixel A8 and pixel A9. If the size of the sliding window is 2*2 (with 2 pixels in both length and width), the electronic device can slide in the first down-sampled image for four times based on the sliding window to obtain four image blocks.

Referring to FIG. 4, image block 1 can include pixels A1, A2, A4 and A5, image block 2 can include pixels A2, A3, A5 and A6, image block 3 can include pixels A4, A5, A7 and A8, and image block 4 can include pixels A5, A6, A8 and A9.

Referring to FIG. 4, the electronic device can determine that the average value of four pixels in image block 1 is pixel B1, the average value of four pixels in image block 2 is pixel B2, the average value of four pixels in image block 3 is pixel B3, and the average value of four pixels in image block 4 is pixel B4.

Referring to FIG. 4, the electronic device may determine a first pooled image based on pixels B1, B2, B3 and B4. In the first pooled image, the pixel at the upper left corner is pixel B1, the pixel at the upper right corner is pixel B2, the pixel at the lower left corner is pixel B3, and the pixel at the lower right corner is pixel B4.

It should be noted that the positions of a plurality of pixels in the first pooled image are associated with the positions of the image blocks in the first down-sampled image, which is not limited in the embodiment of the present disclosure.

It should be noted that the average value of an image block may be an average value of the pixel values of the pixels included in the image block. For example, the average value of the image block can be achieved based on the following formula:

$$B = \frac{1}{C}\sum_{i \in C} A_i,$$

where B is the average value of the image block, C is the number of pixels in the image block, A is the pixel value of the pixel, and i is the code number of the pixel in the image block. For example, in the embodiment shown in FIG. 4, if the pixel values of pixels A1, A2, A4 and A5 in image block 1 is RGB1, RGB2, RGB3, and RGB4, respectively, the pixel value of pixel B1 can be an average value of RGB1, RGB2, RGB3 and RGB4, so that each pixel in the first pooled image can be the average value of a plurality of pixels in the first down-sampled image. Thus, each pixel in the first pooled image can include the information of multiple pixels, thereby improving the accuracy of the first pooled image.

In an embodiment of the present disclosure, the electronic device can process the first down-sampled image based on an average pooling module without padding, and then obtain the first pooled image corresponding to the first down-sampled image, wherein the average pooling module without padding is used to traverse the average value of pixels in each image block of the first down-sampled image, so that the electronic device can obtain the first pooled image based on the average pooling module without padding.

It should be noted that the electronic device can process the first image through the average pooling module without padding, and perform down-sampling processing on the processed image to obtain the first down-sampled image. For example, the electronic device can process the first image through the average pooling module without padding firstly, each pixel in the obtained pooled image can merge multiple pixels in the first image, and then the electronic device can perform sampling processing on the pooled image of the first image through a sampling module (which can perform down-sampling processing on the image based on sampling points) to obtain the first down-sampled image.

S204, determining a plurality of pixel merging weights corresponding to the pixels in the first down-sampled image.

The pixel merging weight is used to merge the pixels in the first down-sampled image and the first pooled image. For example, when the electronic device merges the first down-sampled image and the first pooled image, it may merge a plurality of pixels in the first down-sampled image and a plurality of pixels in the first pooled image based on a plurality of pixel merging weights.

In an embodiment of the present disclosure, the pixel in the first down-sampled image may correspond to at least one pixel merging weight. For example, the pixel in the first down-sampled image may correspond to one pixel merging weight, two pixel merging weights, three pixel merging weights, and so on.

In an embodiment of the present disclosure, the electronic device can determine a plurality of pixel merging weights corresponding to the pixels in the first down-sampled image based on the following feasible implementation: determining a variance associated with the pixels in the first down-sampled image, determining a covariance associated with the pixels in the first down-sampled image, and determining a plurality of pixel merging weights corresponding to the pixels in the first down-sampled image based on the variance and the covariance.

The variance associated with the pixels in the first down-sampled image may include the variance of a plurality of pixels in each image block in the first down-sampled image. For example, if the first down-sampled image can include four image blocks and each image block can include four pixels, the first down-sampled image can correspond to four variances, wherein one variance can be obtained from the values of the four pixels in each image block. In this way, based on the variance and the covariance, the pixel merging weights corresponding to the pixels of the first down-sampled image can be accurately determined, and the accuracy of pixel merging processing is improved, thereby improving the definition of the second image.

In an embodiment of the present disclosure, the electronic device can determine the variance associated with the pixels in the first down-sampled image based on the following feasible implementation: performing squared processing on the pixel value of each pixel in the first down-sampled image to obtain the squared first down-sampled image, performing average pooling processing on the squared first down-sampled image to obtain the second pooled image, performing squared processing on the pixel value of each pixel in the first pooled image to obtain the squared first pooled image, and determining the variance associated with the pixels in the first down-sampled image based on the squared first pooled image and the second pooled image.

In an embodiment of the present disclosure, the squared first down-sampled image may be an image obtained by performing squared processing on the value of each pixel in the first down-sampled image. For example, if the first down-sampled image includes two pixels, with one pixel having a value of 2 and the other pixel having a value of 4, the squared first down-sampled image may also include two pixels, with one pixel having a value of 4 and the other pixel having a value of 16.

In an embodiment of the present disclosure, any pixel in the second pooled image is obtained by merging a plurality of pixels in the squared first down-sampled image. For example, the electronic device can process the squared first down-sampled image based on an average pooling module without padding to obtain the second pooled image. It should be noted that the method for determining the second pooled image is similar to the method for determining the first pooled image, and the details will not be repeated in the embodiment of the present disclosure.

Alternatively, the electronic device may determine the difference between the pixel values of a plurality of pixels in the second pooled image and the pixel values of a plurality of pixels in the squared first pooled image as the variance associated with the pixels in the first down-sampled image.

Hereinafter, the process of determining the variance associated with the pixels in a first down-sampled image will be described with reference to FIG. 5.

Figure 5:
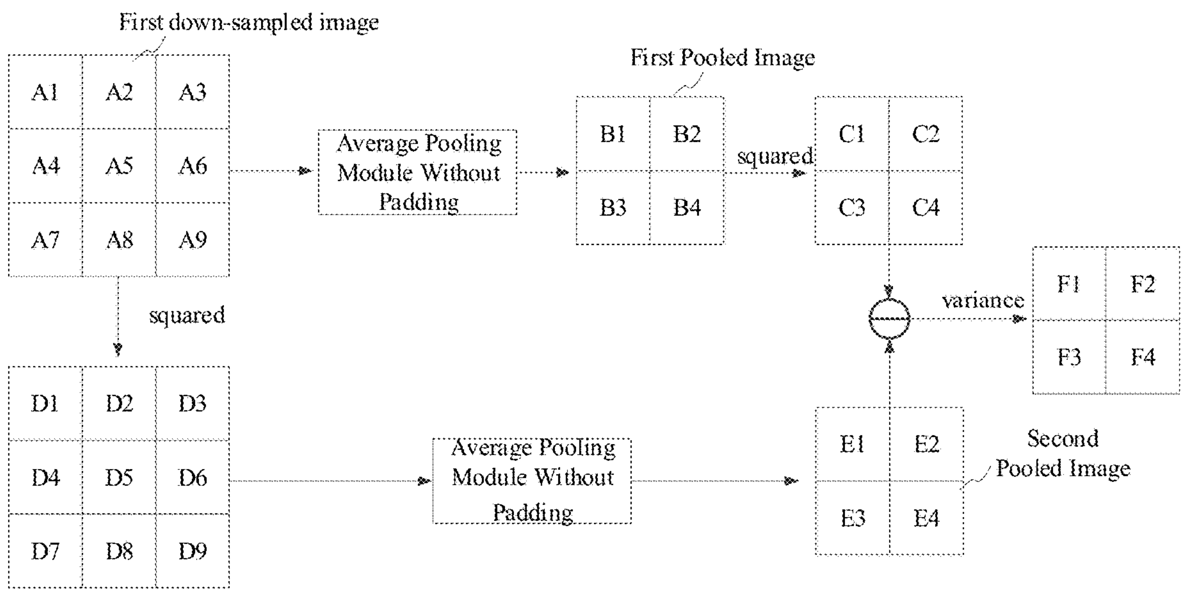
FIG. 5 is a schematic diagram of a process for determining a variance provided by an embodiment of the present disclosure.

FIG. 5 is a schematic diagram of a process for determining a variance provided by an embodiment of the present disclosure. Referring to FIG. 5, which shows a first down-sampled image. The first down-sampled image can include pixel A1, pixel A2, pixel A3, pixel A4, pixel A5, pixel A6, pixel A7, pixel A8 and pixel A9. If the size of the sliding window is 2*2 (with two pixels in both length and width), the electronic device processes the first down-sampled image based on an average pooling module without padding to obtain a first pooled image. The first pooled image can include pixel B1, pixel B2, pixel B3 and pixel B4. The electronic device performs squared processing on the values of the pixels in the first pooled image to obtain the squared first pooled image. The squared first pooled image may include pixels C1, C2, C3 and C4.

Referring to FIG. 5, performing squared processing on the values of the pixels in the first down-sampled image to obtain the squared first down-sampled image. The squared first down-sampled image may include pixels D1, D2, D3, D4, D5, D6, D7, D8 and D9. For example, the value of pixel D1 is the square of the value of pixel A1, the value of pixel D2 is the square of the value of pixel A2, and so on. The electronic device processes the squared first down-sampled image based on an average pooling module without padding to obtain a second pooled image. The second pooled image may include pixels E1, E2, E3 and E4.

Referring to FIG. 5, the electronic device can perform subtraction processing on the pixels in the second pooled image and the pixels in the squared first pooled image to obtain a variance image. The variance image can include pixels F1, F2, F3 and F4, and the values of pixels F1, F2, F3 and F4 can be four variances associated with pixels in the first down-sampled image. In this way, it can improve the accuracy of determining the variances associated with the pixels in the first down-sampled image. It should be noted that after processing the image through the average pooling module without padding, fewer pixels will be lost at the edge of the image, but the loss of a small number of edge pixels has little influence on the display effect of the image.

In an embodiment of the present disclosure, the electronic device can determine a covariance associated with the pixels in the first down-sampled image based on the following feasible implementation: performing squared processing on the pixel value of each pixel in the first image, performing average pooling processing on the squared first image to obtain a third image, performing down-sampling processing on the third image to obtain a down-sampled image associated with the third image, performing average pooling processing on the down-sampled image associated with the third image to obtain a third pooled image, and determining the covariance associated with the pixels in the first down-sampled image based on the third pooled image and the squared first pooled image.

In an embodiment of the present disclosure, the third image can be an image after performing average pooling process on the squared first image. For example, the electronic device can perform squared processing on the pixel value of each pixel in the first image, and process the squared first image based on an average pooling module without padding, to obtain the third image. Each pixel in the third image can be obtained by merging a plurality of pixels in the squared first image.

In an embodiment of the present disclosure, the electronic device may determine the down-sampled image associated with the third image based on any feasible implementation, which is not limited in the embodiment of the present disclosure. It should be noted that each pixel in the third image is obtained by merging a plurality of pixels in the first image, as a result, after the third image is down-sampled, the loss of pixel information is less, thereby improving the display effect of the down-sampled image associated with the third image.

In an embodiment of the present disclosure, the third pooled image may be an image after average pooling processing is performed on the down-sampled image associated with the third image. For example, the electronic device can process the down-sampled image associated with the third image based on an average pooling module without padding, and then a third pooled image can be obtained. Any pixel in the third pooled image is obtained by merging a plurality of pixels in the down-sampled image associated with the third image.

In an embodiment of the present disclosure, the electronic device may determine the covariance associated with the pixels in the first down-sampled image based on the third pooled image and the squared first pooled image. For example, the electronic device may determine the difference between the values of the pixels of the third pooled image and the values of the pixels of the squared first pooled image as the covariance associated with the pixels in the first down-sampled image.

Hereinafter, the process of determining the third pooled image will be described with reference to FIG. 6.

Figure 6:
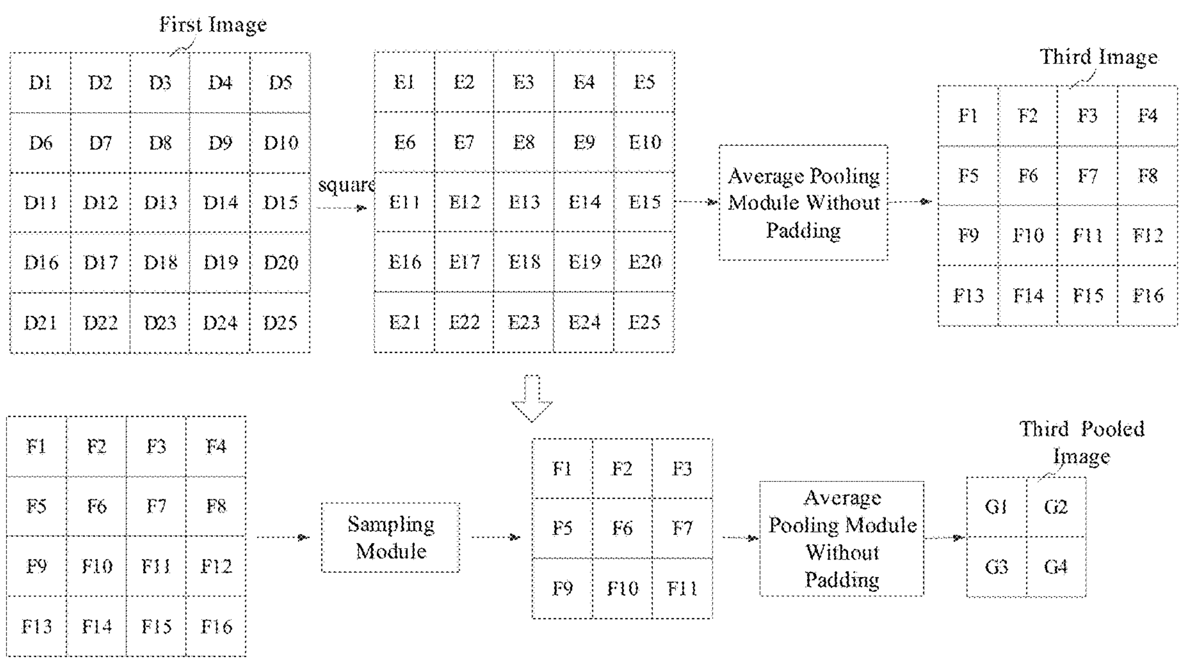
FIG. 6 is a schematic diagram for determining a third pooled image provided by an embodiment of the present disclosure.

FIG. 6 is a schematic diagram for determining a third pooled image provided by an embodiment of the present disclosure. Referring to FIG. 6, which shows a first image. The first image can include 25 pixels (only to illustrate the process of determining the third pooled image, not to limit the pixels in the first image), squared processing is performed on the pixel value of each pixel in the first image, and the squared first image can include 25 pixels.

Referring to FIG. 6, the squared first image is processed based on an average pooling module without padding, to obtain the third image. Each pixel in the third image is obtained by merging the pixels in the squared first image. For example, pixel F1 in the third image is determined based on pixel E1, pixel E2, pixel E6 and pixel E7; and pixel F2 is determined based on pixel E2, pixel E3, pixel E7 and pixel E8.

Referring to FIG. 6, after processing the third image based on a sampling module, a down-sampled image corresponding to the third image can be obtained. For example, the sampling module can determine 9 sampling points in the third image, and the sampling module determines the pixels closest to the sampling points as the pixels in the down-sampled image associated with the third image. For example, the first sampling point is closest to the pixel F1, so the first pixel in the down-sampled image associated with the third image is the pixel F1; the second sampling point is closest to the pixel F2, so the second pixel in the down-sampled image associated with the third image is the pixel F2.

Referring to FIG. 6, the down-sampled image associated with the third image is processed based on an average pooling module without padding, in which the length and width of the sliding window are both 2 pixels, and then the third pooled image is obtained. The third pooled image may include pixels G1, G2, G3 and G4. For example, pixel G1 is determined based on pixel F1, pixel F2, pixel F5 and pixel F6; and pixel G2 is determined based on pixel F2, pixel F3, pixel F6 and pixel F7.

In this way, the pixels in the third pooled image acquired by the electronic device can also include the pixel information in the first image. For example, pixel G1 is obtained based on pixel F1, pixel F2, pixel F5 and pixel F6, while pixel F1, pixel F2, pixel F5 and pixel F6 are obtained based on pixel E1, pixel E2, pixel E3, pixel E6, pixel E7, pixel E8, pixel E11, pixel E12 and pixel E13. Therefore, the third pooled image can retain more pixel information in the first image, thus improving the display effect of the image.

Hereinafter, the process of determining the covariance associated with the pixels in the first down-sampled image will be described with reference to FIG. 7.

Figure 7:
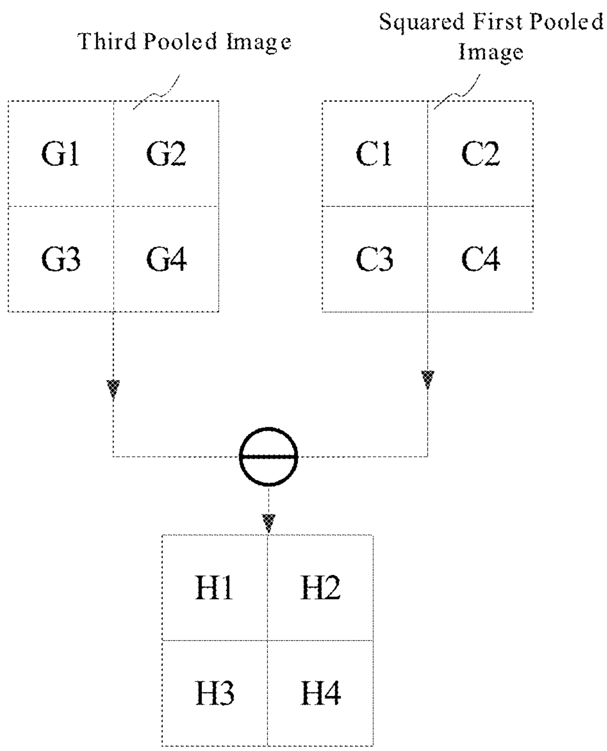
FIG. 7 is a schematic diagram of a process for determining a covariance provided by an embodiment of the present disclosure.

FIG. 7 is a schematic diagram of a process for determining a covariance provided by an embodiment of the present disclosure. Referring to FIG. 7, which shows the third pooled image and the squared first pooled image. The third pooled image may include pixels G1, G2, G3 and G4, and the squared first pooled image may include pixels C1, C2, C3 and C4. It should be noted that the processing procedures of the third pooled image and the squared first pooled image can refer to the embodiments above, and the details will not be repeated in this embodiment of the present disclosure.

Referring to FIG. 7, the covariance image can be obtained by performing subtraction processing on the pixels of the third pooled image and the pixels of the squared first pooled image. The pixel values of the pixel H1, the pixel H2, the pixel H3 and the pixel H4 included in the covariance image may be the covariance associated with the pixels of the first down-sampled image. For example, pixel G1 can be subtracted from pixel C1 to get pixel H1, pixel G2 can be subtracted from pixel C2 to get pixel H2, pixel G3 can be subtracted from pixel C3 to get pixel H3, and pixel G4 can be subtracted from pixel C4 to get pixel H4.

It should be noted that, based on the embodiments shown in the present disclosure, both the variance and the covariance in the embodiments are determined based on the pixels in the image blocks. For example, in the embodiment shown in FIG. 5, the variance indicated by pixel F1 is determined based on pixel C1 and pixel E1, while pixel C1 is determined based on the image block including pixel A1, pixel A2, pixel A4 and pixel A5 and pixel E1 is determined based on the image block including pixel D1, pixel D2, pixel D4 and pixel D5.

In an embodiment of the present disclosure, after the electronic device determines a plurality of variances and a plurality of covariances corresponding to the pixels in the first down-sampled image, the ratio of variances to covariances can be determined as the pixel merging weights. For example, in the embodiments shown in FIGS. 5 and 7, the electronic device can determine the ratio of pixel F1 to pixel H1 as the pixel merging weight, and determine the ratio of pixel F2 to pixel H2 as the pixel merging weight, etc. In the embodiments shown in FIGS. 5 and 7, the pixels in the first down-sampled image can be associated with four pixel merging weights.

It should be noted that the electronic device can also determine the pixel merging weights based on any other feasible implementations, for example, the ratio of covariance to variance is determined as the pixel merging weight, which is not limited in the embodiment of the present disclosure.

S205, performing pixel merging processing on the first down-sampled image and the first pooled image based on the plurality of pixel merging weights, to obtain a second image.

In an embodiment of the present disclosure, the second image may be an image after performing down-sampling processing on the first image. For example, the resolution of the first image is 800*400, and the resolution of the second image can be 400*200 if the down-sampling ratio is 2. It should be noted that the resolution of the second image is similar to that of the down-sampled image of the first image, but the definition of the second image is greater than that of the down-sampled image of the first image because the second image can include more pixel information in the first image.

The electronic device can obtain the second image based on the following feasible implementation: for any pixel (e.g., the first pixel) in the first down-sampled image, obtaining one or more target pixel merging weights determined based on the first pixel among the plurality of pixel merging weights, determining a plurality of target pixels in the first pooled image corresponding to the plurality of pixels in the first down-sampled image, and determining the second image based on the first down-sampled image, the plurality of target pixel merging weights corresponding to the plurality of pixels in the first down-sampled image, and the target pixels corresponding to the plurality of pixels in the first down-sampled image; the first pixel is any pixel in the first down-sampled image.

The pixel merging processing performed on the first down-sampled image and the first pooled image refers to merging each pixel in the first down-sampled image with the pixel in the first pooled image based on the pixel merging weight to obtain a new pixel, which can be a pixel in the second image. For example, if the R value in RGB of pixel A in the first down-sampled image is 100, the pixel in the first pooled image corresponding to pixel A is pixel B (it can be determined based on the position or any feasible implementation, which is not limited in this embodiment) and the R value in RGB of pixel B is 60, and if the pixel merging weight corresponding to pixel A is 0.8, the R value in RGB of the new pixel in the second image is 92 (100*0.8+60*0.2). In this way, the pixels of the second image can include more pixel information of the first image, and less pixel information is lost in the second image, thereby improving the definition and display effect of the second image.

An embodiment of the present disclosure provides an image processing method. An electronic device can acquire a first image, perform down-sampling processing on the first image to obtain a first down-sampled image, determine N image blocks from the first down-sampled image, determine an average pixel value corresponding to a plurality of pixels in each image block, and generate a first pooled image based on the average pixel value corresponding to each image block. The electronic device can determine a plurality of pixel merging weights corresponding to pixels in the first down-sampled image, and perform pixel merging processing on the first down-sampled image and the first pooled image based on the plurality of pixel merging weights, to obtain the second image. In this way, since the first down-sampled image can retain more image information of the first image and the first pooled image can retain more image information of the first down-sampled image, the electronic device can retain more image information of the first image in the obtained second image after performing pixel merging processing on the first pooled image and the first down-sampled image, which can not only reduce the resolution of the second image, but also improve the definition of the second image.

Hereafter, based on the embodiment shown in FIG. 2, the process of performing pixel merging processing on the first down-sampled image and the first pooled image based on the plurality of pixel merging weights to obtain the second image in the above-mentioned image processing method will be described with reference to FIG. 8.

Figure 8:
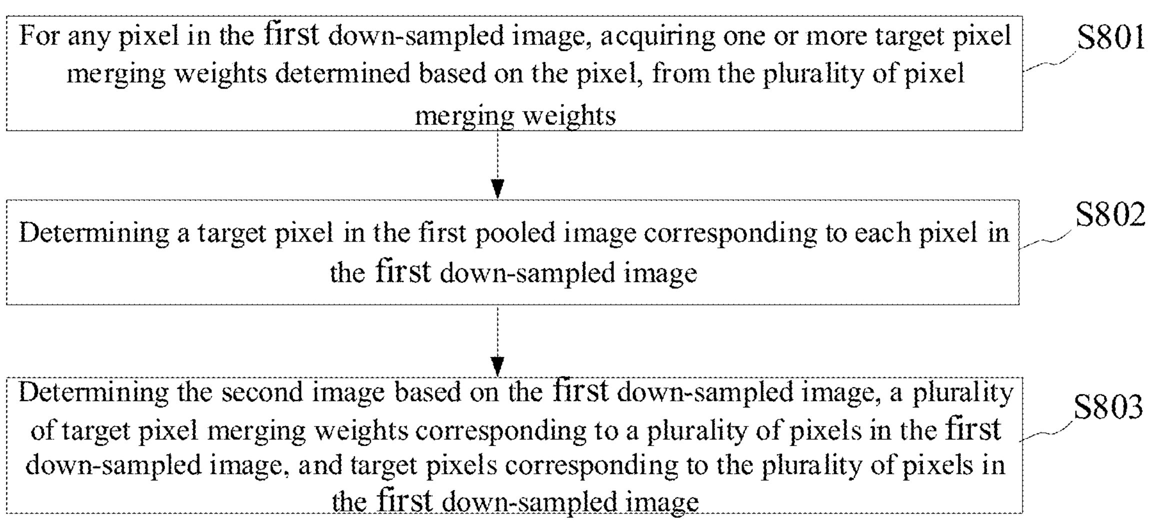
FIG. 8 is a schematic diagram of a method for determining a second image provided by an embodiment of the present disclosure.

FIG. 8 is a schematic diagram of a process for determining a second image provided by an embodiment of the present disclosure. Referring to FIG. 8, the process flow may include:

S801, for any pixel in the first down-sampled image, acquiring one or more target pixel merging weights determined based on the pixel, from the plurality of pixel merging weights.

For any pixel in the first down-sampled image, the target pixel merging weight can be the pixel merging weight determined based on the pixel. For example, the electronic device can determine that the first down-sampled image includes 100 pixel merging weights; and for a pixel in the first down-sampled image, if there are three pixel merging weights determined based on the pixel, the electronic device can determine that the three pixel merging weights are the target pixel merging weights associated with the pixel.

In an embodiment of the present disclosure, the electronic device can determine at least one image block associated with the pixels in the first down-sampled image, and then determine the pixel merging weights associated with the at least one image block associated with the pixels as the target pixel merging weights corresponding to the pixels.

Hereinafter, the process of determining the target pixel merging weight corresponding to the pixel will be described with reference to FIG. 9.

Figure 9:
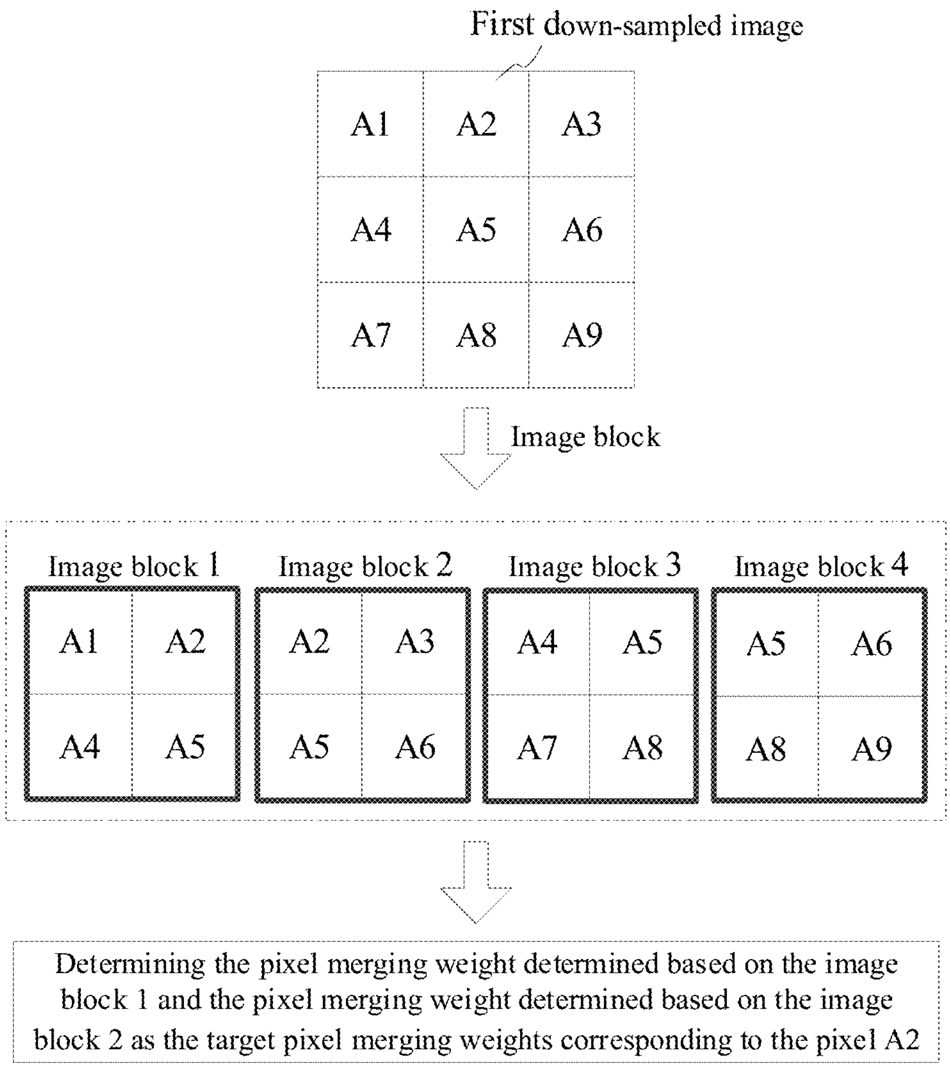
FIG. 9 is a schematic diagram of a process for determining a target pixel merging weight provided by an embodiment of the present disclosure.

FIG. 9 is a schematic diagram of a process for determining a target pixel merging weight provided by an embodiment of the present disclosure. In the embodiment shown in FIG. 9, taking pixel A2 in the first down-sampled image as an example, the process of obtaining the target pixel merging weight corresponding to pixel A2 is described in detail. Referring to FIG. 9, the first down-sampled image may include pixel A1, pixel A2, pixel A3, pixel A4, pixel A5, pixel A6, pixel A7, pixel A8 and pixel A9, and if the size of the sliding window is 2*2 (with 2 pixels for both length and width), the electronic device can determine that the first down-sampled image includes four image blocks.

Referring to FIG. 9, for the pixel A2 in the first down-sampled image, since the pixel A2 is in the image block 1 and the image block 2, the electronic device can determine the pixel merging weight determined based on the image block 1 and the pixel merging weight determined based on the image block 2 as the target pixel merging weights corresponding to the pixel A2. In the embodiment shown in FIG. 9, four pixels can be determined from image block 1, image block 2, image block 3 and image block 4, and the electronic device can determine four pixel merging weights based on the four pixels (referring to the above embodiment, and the details will not be repeated in this embodiment of the present disclosure). Therefore, the electronic device can determine the two pixel merging weights corresponding to image block 1 and image block 2 as the target pixel merging weights of pixel A2.

Hereinafter, the process of determining the target pixel merging weight for pixel A1 will be explained in details with reference to FIG. 5 and FIG. 6 by way of example.

In the embodiment shown in FIG. 5, pixel A1, pixel A2, pixel A4 and pixel A5 can be used to determine pixel B1 in the first pooled image; pixel C1 can be determined after squared processing on pixel B1; and the variance corresponding to pixel F1 can be determined based on pixel C1.

In the embodiment shown in FIG. 6, the third pooled image includes the covariance corresponding to pixel G1, the covariance corresponding to pixel G2, the covariance corresponding to pixel G3 and the covariance corresponding to pixel G4. One pixel merging weight can be determined based on the pixel F1 and pixel G1, so this pixel merging weight can be the target pixel merging weight corresponding to the pixel A1.

It should be noted that in the embodiment shown in FIG. 6, if the sliding window has a size of 3*3 pixels, it slides by one pixel unit at each time. For the pixel D7 in the embodiment shown in FIG. 6, the pixel D7 corresponds to four image blocks, so the pixel D7 can correspond to four target pixel merging weights at most.

S802, determining a target pixel in the first pooled image corresponding to each pixel in the first down-sampled image.

In an embodiment of the present disclosure, the target pixel may be a pixel in the first pooled image associated with a pixel in the first down-sampled image. For example, for a first pixel (it may be any pixel) in the first down-sampled image, a target pixel corresponding to the first pixel may be a pixel in the first pooled image associated with the position of the first pixel. For example, the target pixel corresponding to the pixel in the first row and first column in the first down-sampled image may be the pixel in the first row and first column in the first pooled image; the target pixel corresponding to the pixel in the $10^{th}$ row and $5^{th}$ column in the first down-sampled image may be the pixel in the $10^{th}$ row and $5^{th}$ column in the first pooled image.

For example, in the embodiment shown in FIG. 4, the target pixel corresponding to pixel A1 in the first down-sampled image may be pixel B1; the target pixel corresponding to pixel A2 in the first down-sampled image may be pixel B2; the target pixel corresponding to pixel A3 in the first down-sampled image may be pixel B3; and the target pixel corresponding to pixel A4 in the first down-sampled image may be pixel B4.

It should be noted that after the first down-sampled image is processed based on the average pooling module without padding, some edge pixels will be lost in the obtained first pooled image. For example, in the embodiment shown in FIG. 4, five pixels of the first down-sampled image are lost from the first pooled image. In this way, there are no target pixels for some pixels in the first down-sampled image. However, in the actual application process, there are a huge number of pixels in the image, so there is less influence on the display effect of the image after the average pooling processing without padding.

S803, determining a second image based on the first down-sampled image, a plurality of target pixel merging weights corresponding to the plurality of pixels in the first down-sampled image and target pixels corresponding to the plurality of pixels in the first down-sampled image.

In an embodiment of the present disclosure, for a first pixel (it may be any pixel) in the first down-sampled image, the electronic device can determine one pixel in the second image based on the first pixel, the target pixel merging weight associated with the first pixel and the target pixel associated with the first pixel. In this way, the second image can be obtained by traversing each pixel in the first down-sampled image.

In an embodiment of the present disclosure, the electronic device may determine the second image based on the following formula:

$$\text{output} = \frac{1}{N}\sum\nolimits_{k\in N} \mu_h^k + \frac{\delta_h^k}{\delta_{lh}^k}(L - \mu_h^k),$$

where N can be the number of image blocks corresponding to the pixels, $$\mu_h^k$$

can be the average value of the pixels in the $k^{th}$ image block, $$\delta_h^k$$

can be the variance associated with the pixels in the $k^{th}$ image block, $$\delta_{lh}^k$$

can be the covariance associated with the pixels in the $k^{th}$ image block, and L is the value of the target pixel.

In this way, based on the above formula, the electronic device can determine the pixel of the second image corresponding to each pixel in the first down-sampled image, and then the second image can be obtained.

Hereinafter, a processing performed by an average pooling module with padding involved in an embodiment of the present disclosure will be described with reference to FIG. 10.

Figure 10:
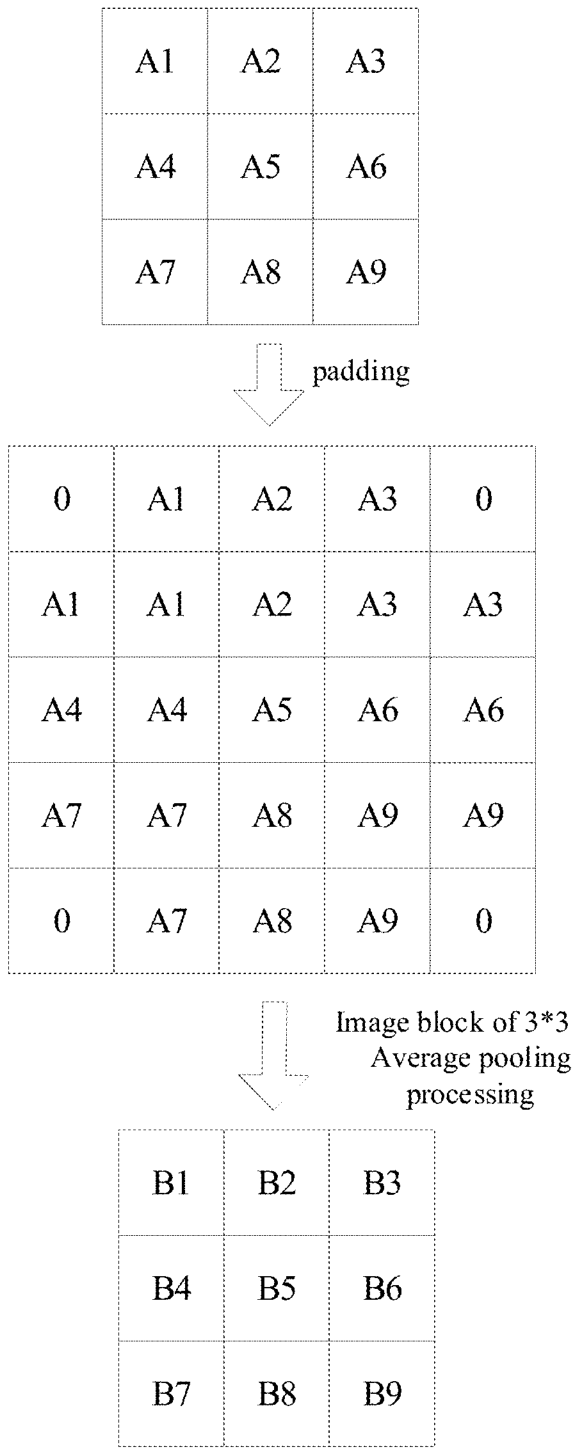
FIG. 10 is a schematic diagram of an average pooling process with padding provided by an embodiment of the present disclosure.

FIG. 10 is a schematic diagram of an average pooling processing with padding provided by an embodiment of the present disclosure. Referring to FIG. 10, the image in FIG. 10 may include pixel A1, pixel A2, pixel A3, pixel A4, pixel A5, pixel A6, pixel A7, pixel A8 and pixel A9. If the length and width of the sliding window are 3 pixels*3 pixels, and the sliding window moves by 1 pixel at each time, the image block is 3*3. Therefore, in order to keep the number of pixels unchanged after performing the average pooling processing on the image, a layer of pixels can be filled at the periphery of the image.

Referring to FIG. 10, after the periphery of the image is filled with a circle of pixels, the number of pixels in the image changes from 3*3 to 5*5. After performing average pooling processing on the image, a new image can be obtained, and the new image can include pixels B1, B2, B3, B4, B5, B6, B7, B8 and B9. For example, pixel B1 is obtained based on 0, pixel A1, pixel A2, pixel A1, pixel A1, pixel A2, pixel A4, pixel A4 and pixel A5 (a pixel value of pixel B1 is obtained based on an average value of these pixel values).

In this way, after the image is processed based on the average pooling module with padding, the number of pixels of the image will not change (the number of pixels of the image will decrease after the image is processed by an average pooling module without padding), thereby improving the display effect of the image.

It should be noted that when filling pixels at the periphery of the image, the electronic device can use all-zero pixels or fill the pixels based on pixel values of edge pixels, which is not limited in the embodiment of the present disclosure. For example, in the embodiment shown in FIG. 10, when pixels are filled above pixels A1, A2 and A3, the filled pixels can be pixels A1, A2 and A3; and when a second circle of pixels needs to be filled, pixels A4, A5 and A6 can be used, so that the display effect of the image can be improved after the average pooling processing.

Hereinafter, the process of determining the second image will be described with reference to FIG. 11.

Figure 11:
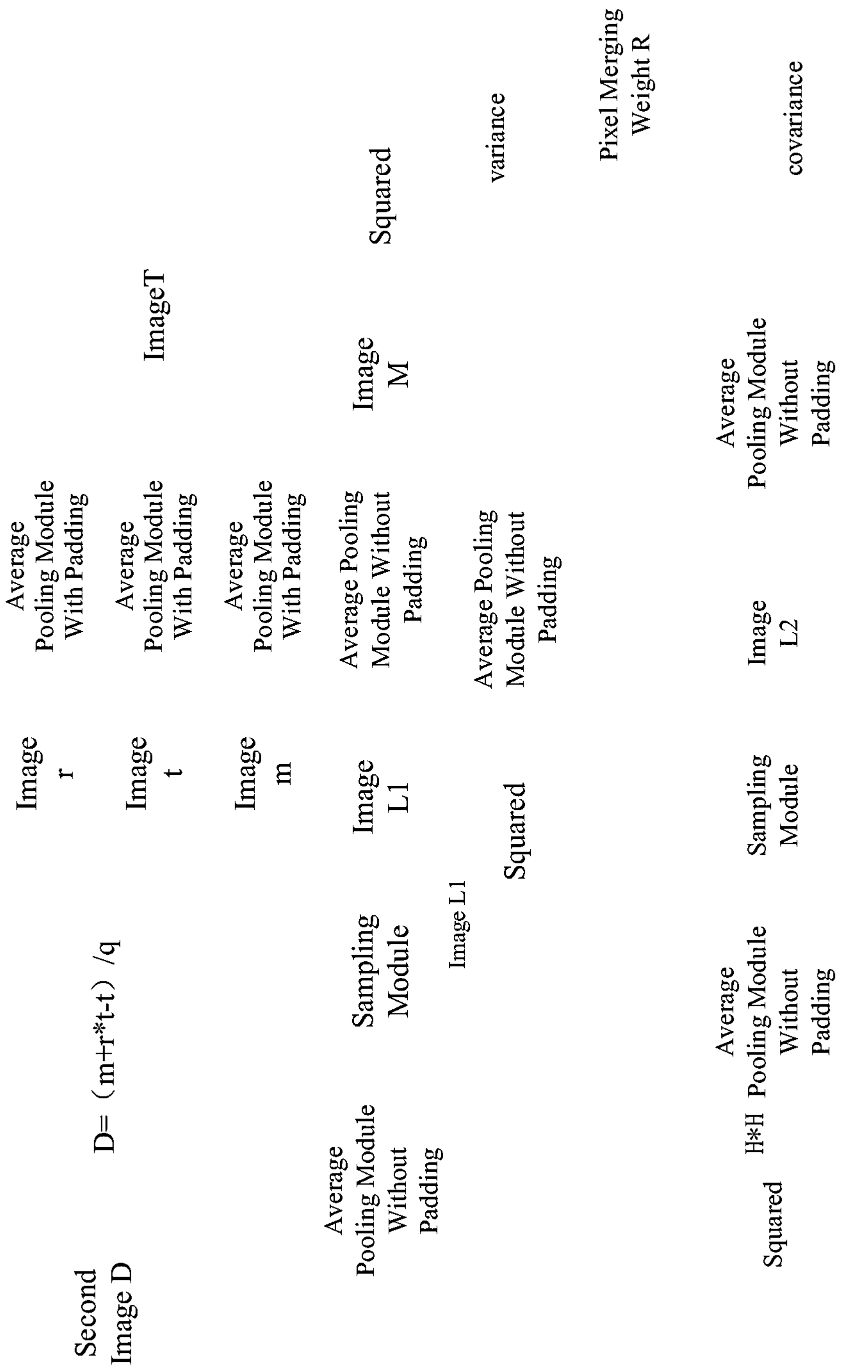
FIG. 11 is a schematic diagram of a process for determining a second image provided by an embodiment of the present disclosure.

FIG. 11 is a schematic diagram of a process for determining a second image provided by an embodiment of the present disclosure. Referring to FIG. 11, which shows a first image H. Processing the first image H based on an average pooling module without padding, and sampling the first image H processed by the average pooling module without padding through a sampling module to obtain an image L1, and processing the image L1 based on the average pooling module without padding to obtain an image M, and performing squared processing on pixels in the image M.

Referring to FIG. 11, performing squared processing on pixels in the first image H, processing the squared first image H based on the average pooling module without padding, and sampling the output of the average pooling module without padding based on the sampling module to obtain an image L2. Processing the image L2 based on the average pooling module without padding. Based on the squared image M and the image L2 processed by the average pooling module without padding, a covariance image (pixel values in the image are correlated to covariance) can be determined.

Referring to FIG. 11, performing squared processing on pixels of the image L1 to obtain a squared image of image L1, processing the squared image of image L1 based on the average pooling module without padding, determining a variance image (pixel values in the image are correlated to variance) based on the squared image of image L1 processed by the average pooling module without padding and the squared image M, and determining a pixel merging weight R (pixel values in this image are correlated to pixel merging weight) based on the variance image and the covariance image.

Referring to FIG. 11, processing the image M based on an average pooling module with padding to obtain an image m, and processing an image T based on the average pooling module with padding to obtain an image t, wherein the image T is determined based on the image M and the pixel merging weight R; processing the pixel merging weight R based on the average pooling module with padding to obtain an image r, and processing an unit matrix Q with the same size of M based on the average pooling module with padding to obtain a matrix q. Based on the matrix q, the image r, the image t and the image m, the second image D can be obtained.

In this way, after down-sampling, the second image can retain more image information of the first image, and the pixel merging weight corresponding to each pixel in the second image is correlated to this pixel, so the pixel merging weight has higher flexibility, thereby improving the flexibility of pixel merging and the definition of the second image.

In an embodiment of the present disclosure, based on the embodiment shown in FIG. 11, when determining the second image, a lightweight down-sampling method may also be included. Hereinafter, the lightweight down-sampling method will be described with reference to FIG. 12.

Figure 12:
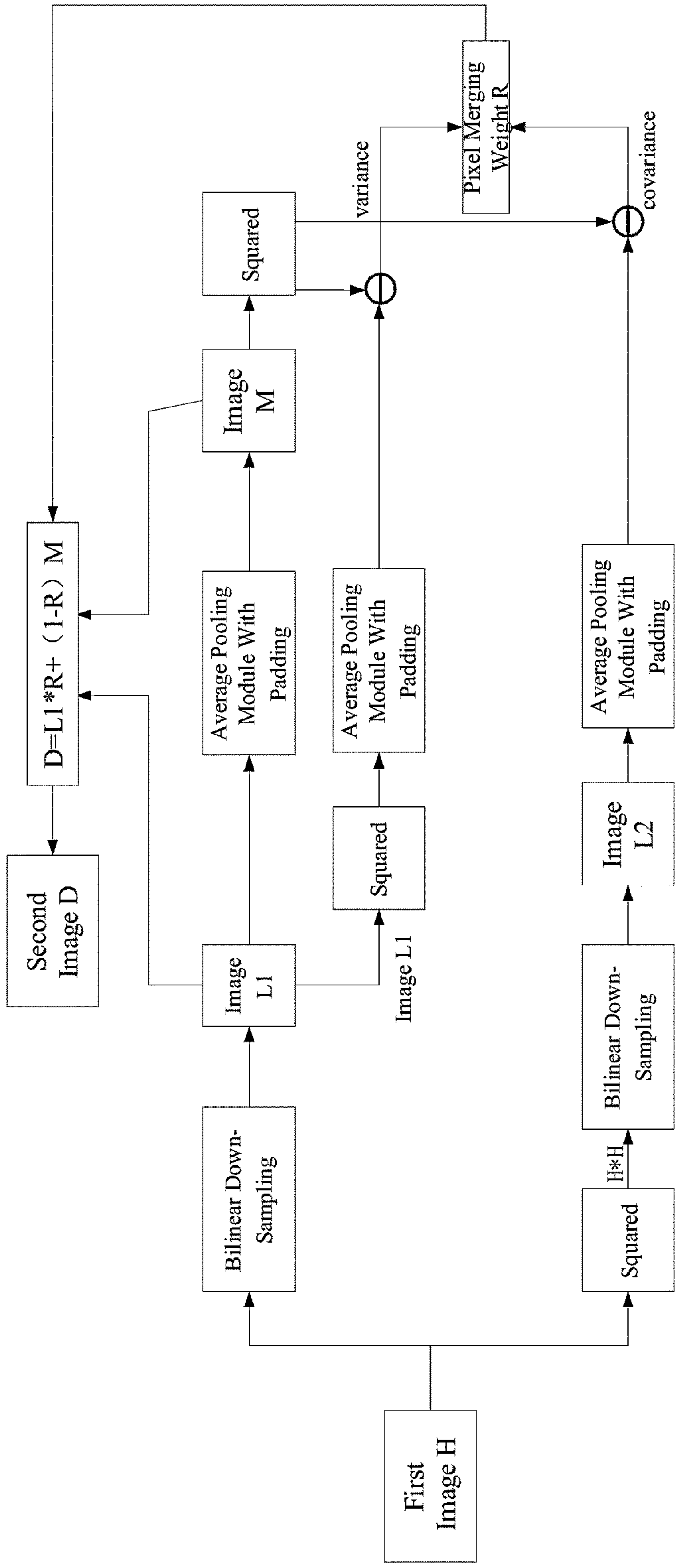
FIG. 12 is a schematic diagram of a lightweight down-sampling method provided by an embodiment of the present disclosure.

FIG. 12 is a schematic diagram of a lightweight down-sampling method provided by an embodiment of the present disclosure. Referring to FIG. 12, which shows a first image H. Performing bilinear down-sampling processing on the first image H to obtain an image L1, processing the image L1 based on the average pooling module with padding to obtain an image M, and performing squared processing on the image M.

Referring to FIG. 12, performing squared processing on pixels in the first image H, and processing the squared first image H based on bilinear down-sampling to obtain an image L2, and processing the image L2 based on the average pooling module with padding. Based on the squared image M and an image obtained after processing the image L2 based on the average pooling module with padding, a covariance image is obtained.

Referring to FIG. 12, performing squared processing on pixels of the image L1 to obtain the squared image of the image L1, and processing the squared image of the image L1 based on the average pooling module with padding to obtain the squared image of the image L1 processed by the average pooling module with padding. Based on the squared image of the image L1 processed by the average pooling module with padding and the squared image M, a variance image is obtained.

Referring to FIG. 12, a pixel merging weight R can be determined based on the covariance image and the variance image, and a second image D can be obtained based on the image L1, the image M and the pixel merging weight R. In this way, the pixels in the second image are determined based on the image L1 and the image M, and the second image can retain more pixel information of the first image, thereby improving the definition and display effect of the second image.

It should be noted that in the lightweight solution, each pixel in the down-sampled image corresponds to one target pixel merging weight, and the electronic device can determine the target pixel merging weight based on any feasible implementation. For example, the electronic device can arbitrarily determine one target pixel merging weight among a plurality of pixel merging weights, or determine the pixel merging weight determined from the image block with the pixel in the center as the target pixel merging weight, which is not limited in the embodiment of the present disclosure.

An embodiment of the present disclosure provides a method for determining a second image, including: for any pixel in the first down-sampled image, acquiring one or more target pixel merging weights determined based on the pixel among a plurality of pixel merging weights, determining a target pixel in the first pooled image corresponding to each pixel in the first down-sampled image, and determining the second image based on the first down-sampled image, a plurality of target pixel merging weights corresponding to a plurality of pixels in the first down-sampled image and target pixels corresponding to the plurality of pixels in the first down-sampled image. In this way, since each pixel in the second image is determined based on the first down-sampled image and an image obtained after performing average pooling processing with padding on the first down-sampled image, more pixel information of the first image can be retained in the second image; furthermore, since the target pixel merging weight corresponding to each pixel is associated with the pixel, the plurality of target pixel merging weights corresponding to the first down-sampled image have higher flexibility, thereby improving the flexibility of down-sampling of the image and improving the image definition after the down-sampling.

Figure 13:
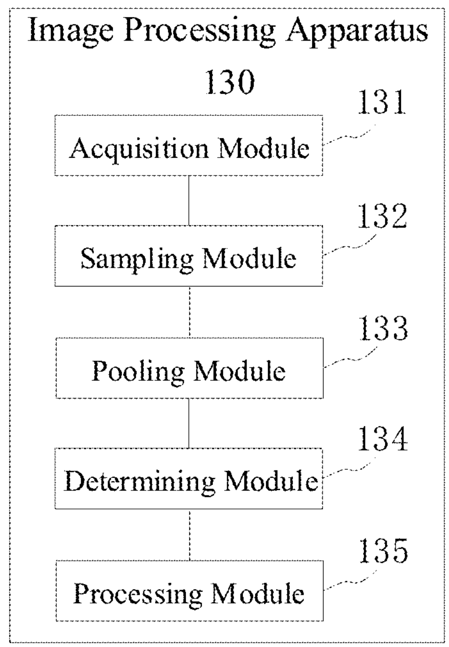
FIG. 13 is a schematic structural diagram of an image processing apparatus provided by an embodiment of the present disclosure.

FIG. 13 is a schematic structural diagram of an image processing apparatus provided by an embodiment of the present disclosure. Referring to FIG. 13, the image processing apparatus 130 includes an acquisition module 131, a sampling module 132, a pooling module 133, a determining module 134 and a processing module 135.

The acquisition module 131 is configured to acquire a first image.

The sampling module 132 is configured to perform down-sampling processing on the first image to obtain a first down-sampled image.

The pooling module 133 is configured to perform average pooling processing on pixels in the first down-sampled image to obtain a first pooled image.

The determining module 134 is configured to determine a plurality of pixel merging weights corresponding to the pixels in the first down-sampled image.

The processing module 135 is configured to perform pixel merging processing on the first down-sampled image and the first pooled image based on the plurality of pixel merging weights to obtain a second image.

According to one or more embodiments of the present disclosure, the pooling module 133 can be configured to:

- determine N image blocks from the first down-sampled image, wherein N is an integer greater than 1;
- determine an average pixel value corresponding to a plurality of pixels in each image block;
- generate the first pooled image based on the average pixel value corresponding to each image block, wherein the first pooled image includes N pixels, and pixel values of the N pixels are in one-to-one correspondence with average pixel values of the N image blocks.

According to one or more embodiments of the present disclosure, the pooling module 133 can be configured to:

- determine a sliding window, wherein the size of the sliding window is the same as that of the image block;
- control the sliding window to slide for N times in the first down-sampled image based on a preset sliding step size to obtain N groups of pixels;
- determine each group of pixels as one image block, to obtain the N image blocks.

According to one or more embodiments of the present disclosure, the determining module 134 can be configured to:

determine a variance associated with the pixels in the first down-sampled image;

determine a covariance associated with the pixels in the first down-sampled image;

determine a plurality of pixel merging weights corresponding to the pixels in the first down-sampled image based on the variance and the covariance.

According to one or more embodiments of the present disclosure, the determining module 134 can be configured to:

perform squared processing on the pixel value of each pixel in the first down-sampled image to obtain a squared first down-sampled image;

perform average pooling processing on the squared first down-sampled image to obtain a second pooled image;

perform squared processing on the pixel value of each pixel in the first pooled image to obtain a squared first pooled image; and determine the variance associated with the pixels in the first down-sampled image based on the squared first pooled image and the second pooled image.

According to one or more embodiments of the present disclosure, the determining module 134 can be configured to:

perform squared processing on the pixel value of each pixel in the first image, and perform average pooling processing on the squared first image to obtain a third image;

perform down-sampling processing on the third image to obtain a down-sampled image associated with the third image;

perform average pooling processing on the down-sampled image associated with the third image to obtain a third pooled image; and determine a covariance associated with pixels in the first down-sampled image based on the third pooled image and the squared first pooled image.

According to one or more embodiments of the present disclosure, the processing module 135 can be configured to:

for any pixel in the first down-sampled image, acquire one or more target pixel merging weights determined based on the pixel from the plurality of pixel merging weights;

determine a target pixel in the first pooled image corresponding to each pixel in the first down-sampled image; and determine the second image based on the first down-sampled image, a plurality of target pixel merging weights corresponding to a plurality of pixels in the first down-sampled image, and target pixels corresponding to the plurality of pixels in the first down-sampled image.

The image processing apparatus provided by the embodiment of the present disclosure can be used to implement the technical solution of the above method embodiments, with similar implementation principle and technical effects, so the details of this embodiment are not repeated here.

Figure 14:
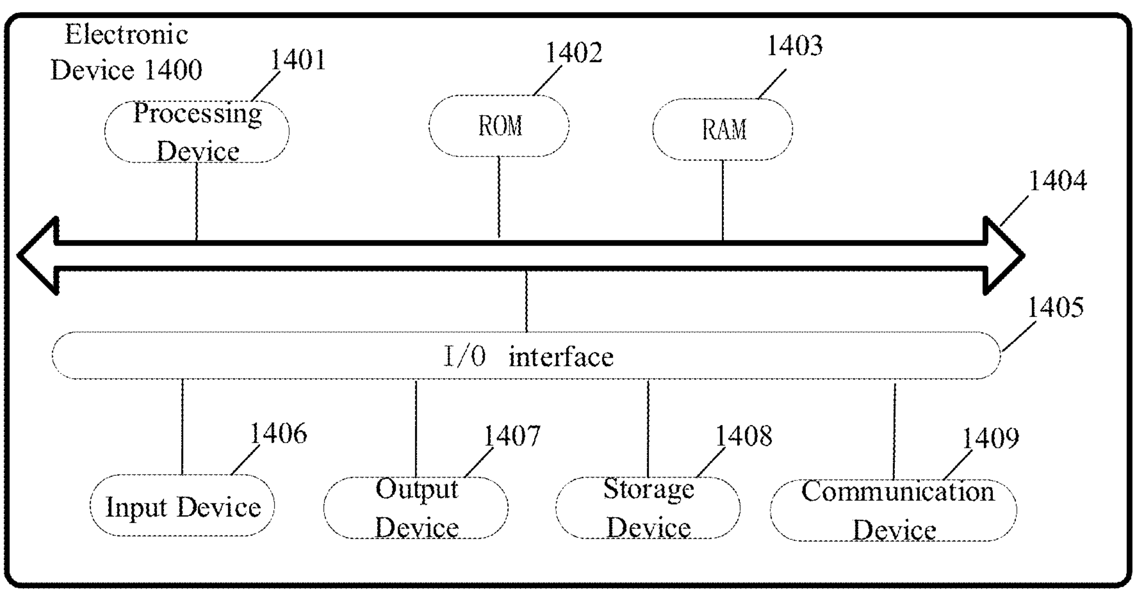
FIG. 14 is a schematic structural diagram of an electronic device provided by an embodiment of the present disclosure.

FIG. 14 is a schematic structural diagram of an electronic device provided by an embodiment of the present disclosure. Referring to FIG. 14, which shows a schematic structural diagram of an electronic device 1400 suitable for implementing the embodiments of the present disclosure. The electronic device 1400 can be any device with on-end computing capability. The electronic device shown in FIG. 14 is just an example, and should not bring any limitation to the function and application scope of the embodiment of the present disclosure.

As shown in FIG. 14, an electronic device 1400 may include a processing device (such as a central processing unit, a graphics processor, etc.) 1401, which may perform various appropriate actions and processes according to a program stored in a Read-Only Memory (ROM) 1402 or a program loaded from a storage device 1408 into a Random-Access Memory (RAM) 1403. In the RAM 1403, various programs and data required for the operation of the electronic device 1400 are also stored. The processing device 1401, the ROM 1402 and the RAM 1403 are connected to each other through a bus 1404. An input/output (I/O) interface 1405 is also connected to the bus 1404.

Generally, the following devices can be connected to the I/O interface 1405: an input device 1406 including, for example, a touch screen, a touch pad, a keyboard, a mouse, a camera, a microphone, an accelerometer, a gyroscope, etc.; an output device 1407 including, for example, a Liquid Crystal Display (LCD), a speaker, a vibrator, etc.; a storage device 1408 including, for example, a magnetic tape, a hard disk, etc.; and a communication device 1409. The communication device 1409 may allow the electronic device 1400 to communicate with other devices wirelessly or in a wired manner to exchange data. Although FIG. 14 shows an electronic device 1400 with various devices, it should be understood that it is not required to implement or have all the devices as shown. More or fewer devices may alternatively be implemented or provided.

In particular, according to an embodiment of the present disclosure, the processes described above with reference to the flowchart can be implemented as a computer software program. For example, an embodiment of the present disclosure includes a computer program product, which includes a computer program carried on a computer-readable medium, and the computer program contains program codes for executing the method shown in the flowchart. In such an embodiment, the computer program can be downloaded and installed from the network through the communication device 1409, or installed from the storage device 1408, or installed from the ROM 1402. When the computer program is executed by the processing device 1401, the above functions defined in the method of the embodiments of the present disclosure are performed.

It should be noted that the computer-readable medium mentioned above in the present disclosure can be a computer-readable signal medium or a computer-readable storage medium or any combination of the two. The computer-readable storage medium can be, for example, but not limited to, an electrical, magnetic, optical, electromagnetic, infrared, or semiconductor system, apparatus or device, or a combination of any of the above. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which can be used by or in combination with an instruction execution system, apparatus or device. In the present disclosure, a computer-readable signal medium may include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, RF (radio frequency) and the like, or any suitable combination of the above.

The computer-readable medium may be included in the electronic device; or it can exist alone without being assembled into the electronic device.

The computer-readable medium carries one or more programs, which, when executed by the electronic device, cause the electronic device to perform the method shown in the above embodiments.

An embodiment of the present disclosure provides a computer-readable storage medium, in which computer-executable instructions are stored, and when a processor executes the computer-executable instructions, the image processing method as described in the above embodiments is realized.

An embodiment of the present disclosure provides a computer program product, including a computer program, which, when executed by a processor, realizes the image processing method as described in the above embodiments.

Computer program codes for performing the operations of the present disclosure may be written in one or more programming languages or their combinations, including but not limited to object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiments described in the present disclosure can be realized by software or hardware. Among them, the name of the unit does not constitute any limitation of the unit itself in some cases.

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more lines, a portable computer disk, a hard disk, a random-access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

It should be noted that the modifiers such as "a/an/one" and "a plurality of" mentioned in the present disclosure are schematic rather than limitative, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

It should be understood that prior to using the technical solution disclosed in various embodiments of the present disclosure, users should be informed of the type, scope of usage, usage scenarios, etc. of personal information involved in the present disclosure in an appropriate way in accordance with relevant laws and regulations and be authorized by the users.

For example, in response to receiving a user's active request, prompt information is sent to the user to clearly remind the user that the operation requested by the user will require obtaining and using the user's personal information. Therefore, the user can independently choose whether to provide personal information to software or hardware such as electronic devices, applications, servers or storage mediums that perform the operation of the technical solution of the present disclosure according to the prompt information. As an optional but non-limiting implementation, in response to receiving the user's active request, the way to send the prompt information to the user can be, for example, a pop-up window, in which the prompt information can be presented in text. In addition, the pop-up window can also carry a selection control for the user to choose "agree" or "disagree" to provide personal information to the electronic device. It can be understood that the above process of notifying and obtaining user authorization is only schematic, and does not limit the implementation of the present disclosure. Other ways in accordance with relevant laws and regulations can also be applied to the implementation of the present disclosure.

It should be understood that the data involved in the technical solution (including but not limited to the data itself, data acquisition or data usage) shall comply with the requirements of corresponding laws, regulations and relevant regulations. Data can include information, parameters, messages, etc., such as instruction information of stream switching.

The above description merely refers to exemplary embodiments of the present disclosure and the explanation of the applied technical principles. It should be understood by those skilled in the art that the disclosure scope involved in the present disclosure is not limited to the technical solution formed by the specific combination of the above technical features, but also covers other technical solutions formed by any combination of the above technical features or their equivalent features without departing from the above disclosure concept. For example, the technical solution formed by replacing the above features with (but not limited to) technical features having similar functions disclosed in the present disclosure.

Furthermore, although the operations are depicted in a particular order, this should not be understood as requiring that these operations be performed in the particular order as shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the appended claims.

The invention claimed is:

1. An image processing method, comprising:

acquiring a first image;

performing down-sampling processing on the first image to obtain a first down-sampled image;

performing average pooling processing on pixels in the first down-sampled image to obtain a first pooled image;

determining a plurality of pixel merging weights corresponding to the pixels in the first down-sampled image; and performing pixel merging processing on the first down-sampled image and the first pooled image based on the plurality of pixel merging weights to obtain a second image.

2. The method according to claim 1, wherein performing average pooling processing on the pixels in the first down-sampled image to obtain the first pooled image, comprising:

determining N image blocks from the first down-sampled image, wherein N is an integer greater than 1;

determining an average pixel value corresponding to a plurality of pixels in each image block of the N image blocks; and generating the first pooled image based on the average pixel value corresponding to each image block, wherein the first pooled image comprises N pixels, and pixel values of the N pixels are in one-to-one correspondence with average pixel values of the N image blocks.

3. The method according to claim 2, wherein determining the N image blocks from the first down-sampled image, comprising:

determining a sliding window, wherein a size of the sliding window is as same as that of the image block;

controlling the sliding window to slide for N times in the first down-sampled image based on a preset sliding step size to obtain N groups of pixels; and determining each group of pixels of the N groups of pixels as one image block, to obtain the N image blocks.

4. The method according to claim 1, wherein determining the plurality of pixel merging weights corresponding to the pixels in the first down-sampled image, comprising:

determining a variance associated with the pixels in the first down-sampled image;

determining a covariance associated with the pixels in the first down-sampled image; and determining the plurality of pixel merging weights corresponding to the pixels in the first down-sampled image based on the variance and the covariance.

5. The method according to claim 4, wherein determining the variance associated with the pixels in the first down-sampled image, comprising:

performing squared processing on a pixel value of each of the pixels in the first down-sampled image to obtain a squared first down-sampled image;

performing average pooling processing on the squared first down-sampled image to obtain a second pooled image;

performing squared processing on a pixel value of each of pixels in the first pooled image to obtain a squared first pooled image; and determining the variance associated with the pixels in the first down-sampled image based on the squared first pooled image and the second pooled image.

6. The method according to claim 5, wherein determining the covariance associated with the pixels in the first down-sampled image, comprising:

performing squared processing on a pixel value of each of pixels in the first image to obtain a squared first image, and performing average pooling processing on the squared first image to obtain a third image;

performing down-sampling processing on the third image to obtain a third down-sampled image associated with the third image;

performing average pooling processing on the third down-sampled image associated with the third image to obtain a third pooled image; and determining the covariance associated with the pixels in the first down-sampled image based on the third pooled image and the squared first pooled image.

7. The method according to claim 1, wherein performing pixel merging processing on the first down-sampled image and the first pooled image based on the plurality of pixel merging weights to obtain the second image, comprising:

for each pixel of a plurality of pixels in the first down-sampled image, obtaining one or more target pixel merging weights determined based on the pixel from the plurality of pixel merging weights, to obtain a plurality of target pixel merging weights corresponding to the plurality of pixels in the first down-sampled image;

determining a target pixel in the first pooled image corresponding to each pixel in the first down-sampled image, to obtain a plurality of target pixels corresponding to the plurality of pixels in the first down-sampled image; and determining the second image based on the first down-sampled image, the plurality of target pixel merging weights, and the plurality of target pixels.

8. An electronic device, comprising: at least one processor and a memory on which computer-readable instructions are stored; wherein the at least one processor is configured to execute the computer-executable instructions stored in the memory, so that the at least one processor executes an image processing method, comprising:

acquiring a first image;

performing down-sampling processing on the first image to obtain a first down-sampled image;

performing average pooling processing on pixels in the first down-sampled image to obtain a first pooled image;

determining a plurality of pixel merging weights corresponding to the pixels in the first down-sampled image; and performing pixel merging processing on the first down-sampled image and the first pooled image based on the plurality of pixel merging weights to obtain a second image.

9. The electronic device according to claim 8, wherein in the image processing method, performing average pooling processing on the pixels in the first down-sampled image to obtain the first pooled image, comprising:

determining N image blocks from the first down-sampled image, wherein N is an integer greater than 1;

determining an average pixel value corresponding to a plurality of pixels in each image block of the N image blocks; and generating the first pooled image based on the average pixel value corresponding to each image block, wherein the first pooled image comprises N pixels, and pixel values of the N pixels are in one-to-one correspondence with average pixel values of the N image blocks.

10. The electronic device according to claim 9, wherein in the image processing method, determining the N image blocks from the first down-sampled image, comprising:

determining a sliding window, wherein a size of the sliding window is as same as that of the image block;

controlling the sliding window to slide for N times in the first down-sampled image based on a preset sliding step size to obtain N groups of pixels; and determining each group of pixels of the N groups of pixels as one image block, to obtain the N image blocks.

11. The electronic device according to claim 8, wherein in the image processing method, determining the plurality of pixel merging weights corresponding to the pixels in the first down-sampled image, comprising:

determining a variance associated with the pixels in the first down-sampled image;

determining a covariance associated with the pixels in the first down-sampled image; and determining the plurality of pixel merging weights corresponding to the pixels in the first down-sampled image based on the variance and the covariance.

12. The electronic device according to claim 11, wherein in the image processing method, determining the variance associated with the pixels in the first down-sampled image, comprising:

performing squared processing on a pixel value of each of the pixels in the first down-sampled image to obtain a squared first down-sampled image;

performing average pooling processing on the squared first down-sampled image to obtain a second pooled image;

performing squared processing on a pixel value of each of pixels in the first pooled image to obtain a squared first pooled image; and determining the variance associated with the pixels in the first down-sampled image based on the squared first pooled image and the second pooled image.

13. The electronic device according to claim 12, wherein in the image processing method, determining the covariance associated with the pixels in the first down-sampled image, comprising:

performing squared processing on a pixel value of each of pixels in the first image to obtain a squared first image, and performing average pooling processing on the squared first image to obtain a third image;

performing down-sampling processing on the third image to obtain a third down-sampled image associated with the third image;

performing average pooling processing on the third down-sampled image associated with the third image to obtain a third pooled image; and determining the covariance associated with the pixels in the first down-sampled image based on the third pooled image and the squared first pooled image.

14. The electronic device according to claim 8, wherein in the image processing method, performing pixel merging processing on the first down-sampled image and the first pooled image based on the plurality of pixel merging weights to obtain the second image, comprising:

for each pixel of a plurality of pixels in the first down-sampled image, obtaining one or more target pixel merging weights determined based on the pixel from the plurality of pixel merging weights, to obtain a plurality of target pixel merging weights corresponding to the plurality of pixels in the first down-sampled image;

determining a target pixel in the first pooled image corresponding to each pixel in the first down-sampled image, to obtain a plurality of target pixels corresponding to the plurality of pixels in the first down-sampled image; and determining the second image based on the first down-sampled image, the plurality of target pixel merging weights, and the plurality of target pixels.

15. A non-transient computer-readable storage medium on which computer-executable instructions are stored, wherein the computer-executable instructions, when executed by a processor, are configured to cause the processer to execute an image processing method, comprising:

acquiring a first image;

performing down-sampling processing on the first image to obtain a first down-sampled image;

performing average pooling processing on pixels in the first down-sampled image to obtain a first pooled image;

determining a plurality of pixel merging weights corresponding to the pixels in the first down-sampled image; and performing pixel merging processing on the first down-sampled image and the first pooled image based on the plurality of pixel merging weights to obtain a second image.

16. The non-transient computer-readable storage medium according to claim 15, wherein in the image processing method, performing average pooling processing on the pixels in the first down-sampled image to obtain the first pooled image, comprising:

determining N image blocks from the first down-sampled image, wherein N is an integer greater than 1;

determining an average pixel value corresponding to a plurality of pixels in each image block of the N image blocks; and generating the first pooled image based on the average pixel value corresponding to each image block, wherein the first pooled image comprises N pixels, and pixel values of the N pixels are in one-to-one correspondence with average pixel values of the N image blocks.

17. The non-transient computer-readable storage medium according to claim 16, wherein in the image processing method, determining the N image blocks from the first down-sampled image, comprising:

determining a sliding window, wherein a size of the sliding window is as same as that of the image block;

controlling the sliding window to slide for N times in the first down-sampled image based on a preset sliding step size to obtain N groups of pixels; and determining each group of pixels of the N groups of pixels as one image block, to obtain the N image blocks.

18. The non-transient computer-readable storage medium according to claim 15, wherein in the image processing method, determining the plurality of pixel merging weights corresponding to the pixels in the first down-sampled image, comprising:

determining a variance associated with the pixels in the first down-sampled image;

determining a covariance associated with the pixels in the first down-sampled image; and determining the plurality of pixel merging weights corresponding to the pixels in the first down-sampled image based on the variance and the covariance.

19. The non-transient computer-readable storage medium according to claim 18, wherein in the image processing method, determining the variance associated with the pixels in the first down-sampled image, comprising:

performing squared processing on a pixel value of each of the pixels in the first down-sampled image to obtain a squared first down-sampled image;

performing average pooling processing on the squared first down-sampled image to obtain a second pooled image;

performing squared processing on a pixel value of each of pixels in the first pooled image to obtain a squared first pooled image; and determining the variance associated with the pixels in the first down-sampled image based on the squared first pooled image and the second pooled image.

20. The non-transient computer-readable storage medium according to claim 19, wherein in the image processing method, determining the covariance associated with the pixels in the first down-sampled image, comprising:

performing squared processing on a pixel value of each of pixels in the first image to obtain a squared first image, and performing average pooling processing on the squared first image to obtain a third image;

performing down-sampling processing on the third image to obtain a third down-sampled image associated with the third image;

performing average pooling processing on the third down-sampled image associated with the third image to obtain a third pooled image; and determining the covariance associated with the pixels in the first down-sampled image based on the third pooled image and the squared first pooled image.

* * * * *